United States Patent [19]

Shoji et al.

[11] 4,396,913

[45] Aug. 2, 1983

[54] ELECTROCHROMIC DISPLAY DEVICE

[75] Inventors: Masami Shoji, Takatsuki; Takashi Aoyama, Ikeda; Rikusei Kohara, Ibaraki, all of Japan

[73] Assignee: Matsushita Electric Industrial Co., Ltd., Kadoma, Japan

[21] Appl. No.: 249,865

[22] Filed: Apr. 1, 1981

[30] Foreign Application Priority Data

Apr. 2, 1980 [JP] Japan ................. 55-43948

[51] Int. Cl.³ ........................... G09F 9/32
[52] U.S. Cl. ..................... 340/785; 340/811; 340/812; 340/813
[58] Field of Search .......... 340/785, 783, 763, 811, 340/812, 813

[56] References Cited

U.S. PATENT DOCUMENTS 4,092,637 5/1978 Barclay et al. ............ 340/763
4,229,080 10/1980 Take et al. ............... 340/785

FOREIGN PATENT DOCUMENTS 54-40597 3/1979 Japan ................. 340/785

*Primary Examiner*—Michael A. Masinick
*Attorney, Agent, or Firm*—Cushman, Darby & Cushman

[57] ABSTRACT

In an electrochromic display device having a plural number of indication electrodes displaying an information by repetition of coloring mode and discoloring mode, both modes of the indication electrodes being caused by an electrochemical oxidation-reduction reaction at the indication electrodes, and having an auxiliary electrode and counter-electrode to the indication electrodes and to the auxiliary electrode, the improvement is that an auxiliary electrode is further provided so as to act as the same acting mode as that of at least one of the indication electrodes, thereby removing an irregularity of color density of displaying at the acting indication electrodes.

7 Claims, 9 Drawing Figures

| electrode segments<br>numerals to indicate | a | b | c | d | e | f | g | d̄ |
|---|---|---|---|---|---|---|---|---|
| 0 | ○ | ○ | ○ | ○ | ○ | ○ |   |   |
| 1 |   | ○ | ○ |   |   |   |   | ○ |
| 2 | ○ | ○ |   | ○ | ○ |   | ○ |   |
| 3 | ○ | ○ | ○ | ○ |   |   | ○ |   |
| 4 |   | ○ | ○ |   |   | ○ | ○ | ○ |
| 5 | ○ |   | ○ | ○ |   | ○ | ○ |   |
| 6 | ○ |   | ○ | ○ | ○ | ○ | ○ |   |
| 7 | ○ | ○ | ○ |   |   |   |   | ○ |
| 8 | ○ | ○ | ○ | ○ | ○ | ○ | ○ |   |
| 9 | ○ | ○ | ○ | ○ |   | ○ | ○ |   |

ELECTROCHROMIC DISPLAY DEVICE

BACKGROUND OF THE INVENTION

1. Field of the Invention

This invention relates to an improvement in an electrochromic display device (ECD) utilizing an electrochromism phenomenon, and particularly concerns an ECD wherein area of the effective electrodes varies in a manner similar to that of a seven segment numeral indicator.

2 Description of the Prior Art

An ECD is a display device which utilizes a specified solution (substance) which exhibits an electrochromism phenomenon (for short EC-solution), whereby the EC-substance electrochemically forms a color indication product on a surface of one of a pair of electrodes, disposed with the EC-substance inbetween, when a voltage is applied to the electrode pair.

A general ECD structure is schematically shown in FIG. 1, wherein a container 1 contains an EC-solution 2 and an electrode pair consisting of an indication electrode 3 and a counter-electrode 4. A color indication product is deposited on the indication electrode 3 when a charge is supplied from a battery 5 through a switching means 6. B6 changing-over switch 6, the polarity of the current is reversed, and therefore the supplied charge is removed from the indication electrode 3.

Generally, an ECD can be divided into two broad categories: organic type; and inorganic type. An ECD of the organic type utilizes a biologen derivative for a coloring surface, and an ECD of the inorganic type utilizes a tungsten oxide for a coloring substance. Both types of ECD are in general well known.

Since an ECD utilizes an electrochemical electrochromism phenomenon on the electrode pair with an high conductivity EC-solution interposed inbetween, the supplied charge density at the indication electrode changes depending on the area thereof. Therefore, the color display density at the indication electrode is changed corresponding to change of the total area of the effective indication electrode when the area of the counter-electrode is constant. Accordingly, where an ECD is used for selective indications of numerals 0 to 9, that is, as a figure display device of seven segments type, the color density of the display at the face of the indicating electrode changes for different numerals, since total area of the effective electrode is different for every numeral or mark. This is a primary cause of irregularity of display color density between the numerals.

SUMMARY OF THE INVENTION

The purpose of the invention is to provide an effective means for supressing irregularities of display color density on an indication electrode in a device where indications are made by selecting combinations of display segments for selected information. Furthermore, the present invention provides an ECD of high display quality using a simple method of driving the electrodes.

DESCRIPTION OF PREFERRED EMBODIMENTS

An electrochromic display device (ECD) of the present invention includes indicating electrodes which selectively change between an active mode, i.e., colored mode, and an inactive (uncolored) mode, on the surface of the indicating electrodes, by electrochemical reaction. The ECD of present invention comprises a plurality of indicating electrodes to indicate information by selecting a combination thereof, and an auxiliary electrode which is driven together with the indicating electrodes when a combination of indicating electrodes has a comparatively small sum total of indicating area, to suppress changing of color density of the indication.

Figure 4:
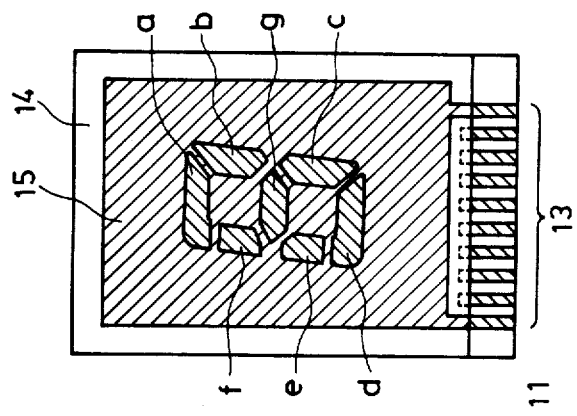
FIG. 2, FIG. 3 and FIG. 4 are plane views of an arrangement of electrodes embodying the present invention.
Figure 3:
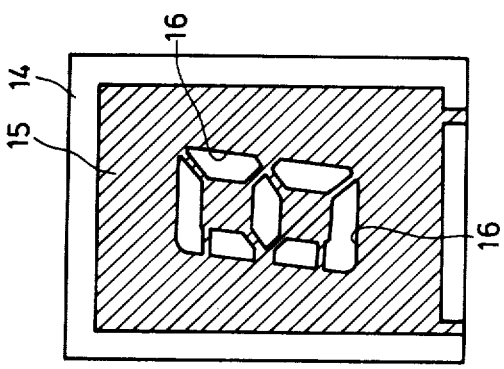
Figure 2:
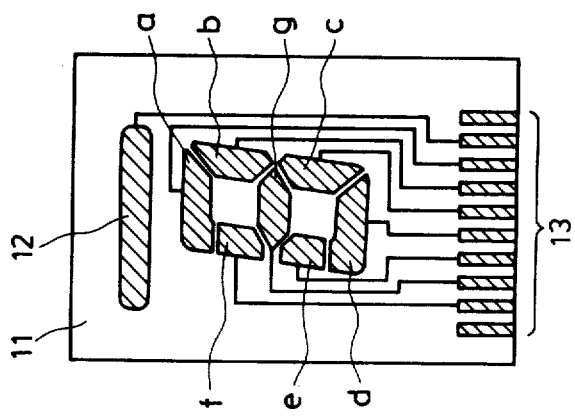

The present invention is elucidated herein with reference to FIGS. 2, 3 and 4 which show a preferred embodiment of the invention.

FIG. 2 is a plane view of a first substrate comprising indication electrodes and auxiliary electrodes and their connection terminals. FIG. 3 is a plane view of a second substrate comprising a counter electrode and its connection terminals. FIG. 4 is a plane view of an assembled device consisting of the first substrate shown in FIG. 2 and the second substrate shown in FIG. 3.

In FIG. 2, seven segments of a numeral displaying device of seven segments tpe are disposed as wellknown arrangement on one surface of a first glass substrate 11 with an auxiliary electrode 12. A segment (i.e., indicating electrode) of the seven segments is referred as "a", "b", "c", "d", "e", "f", or "g" segment as shown in FIG. 2. Each segment is connected to a respective corresponding contact 13 on a side edge of the glass substrate 11 to be driven separately.

In FIG. 3, a counter electrode 15 is disposed on rear face of a second glass substrate 14 (somtimes referred to herein as a "face-glass"). The counter electrode includes aperture 16 to permit viewing of the indicator segments as will be explained.

As shown in FIG. 4, the second glass substrate 14 of FIG. 3 is placed above the first glass substrate 11 of FIG. 2 in a manner that the respective indicator segment electrodes on the first glass substrate 11 underlie the apertures 16 of the counter electrode 15 on the second glass plate 14. A spacer of a predetermined thickness is placed between the two substrates 11 and 14 at the periphery thereof. Then the space formed between glass substrates 11 and 14 is sealed around the periphery after an electrolyte including an EC-solution is confined in the space. The segments a to g can be seen through the apartures 16 in the counter-electrode 15.

In the embodiment of present invention, indicating electrodes segments a–g, the auxiliary electrode 12, and the counter-electrode 15 are formed by a gold film. Therefore the auxiliary electrode 12 shown in FIG. 2 is hidden by the overlying counter-electrode 15. In this embodiment, a para-cyanophenyl-biologen is utilized as the EC-solution to obtain a clear green indication at the respective segment "a"–"g" of the indicating electrode group. To effect indication of numerals 0 to 9, segments "a"–"g" are selectively connected to a voltage source in accordance with the figure to be displayed.

Figures 1, 5:
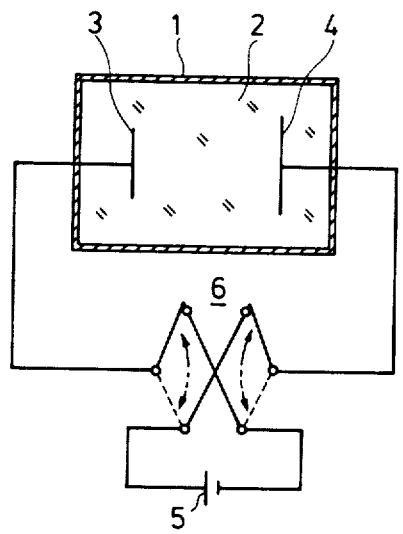
FIG. 1 is a schematic sectional view of a general an ECD structure.
FIG. 5 is a chart showing the acting mode of a seven segments display device embodying the present invention.

FIG. 5 shows actuation modes of the segments a–g and auxiliary electrode 12 (represented by "d̄"), to effect display of numerals 0 to 9. In the table of FIG. 5, circle marks denote an indicating (colored) mode operation by the respective segments and auxiliary electrode. As shown in FIG. 5, in case of displaying numerals 0 to 9, in a seven segment type device, numerals "1", "4" and "7" use a comparatively small number of segments for indication. For example, numeral "1" needs only two segments "b" and "c", numeral "4" needs four segments "b", "c", "f" and "g", and numeral "7" needs segments "a" "b" and "c". Therefore the total area of indicating electrodes to indicate the numeral "1", "4" or "7" is comparatively small. Accordingly, the auxiliary electrode 12 (i.e. "d̄") is driven in the same actuation mode as the segments actuated for indicating figure "1", "4" or "7" as shown in FIG. 5 for compensating smallness of the electrode area. Accordingly the sum total acreas of indicating electrodes when indicating the numerals "1", "4" or "7" can be substanially broadened by the operation of auxiliary electrode 12, so that the display color density by the segments during indications of the respective numerals can be made substantially uniform. In the present example, the auxiliary electrode 12 is hidden by counter-electrode 15. Accordingly, the information display is not disturbed when the auxiliary electrode colors under the shielding.

In practice auxiliary electrode 12 is selectively driven by an indication signal, without requiring an additional control signal like those for the then-actuated indication electrode segments. That is, the auxiliary electrode 12 is driven by an indication signal derived from the control signals to the-then resting indication electrode segments.

Figure 6:
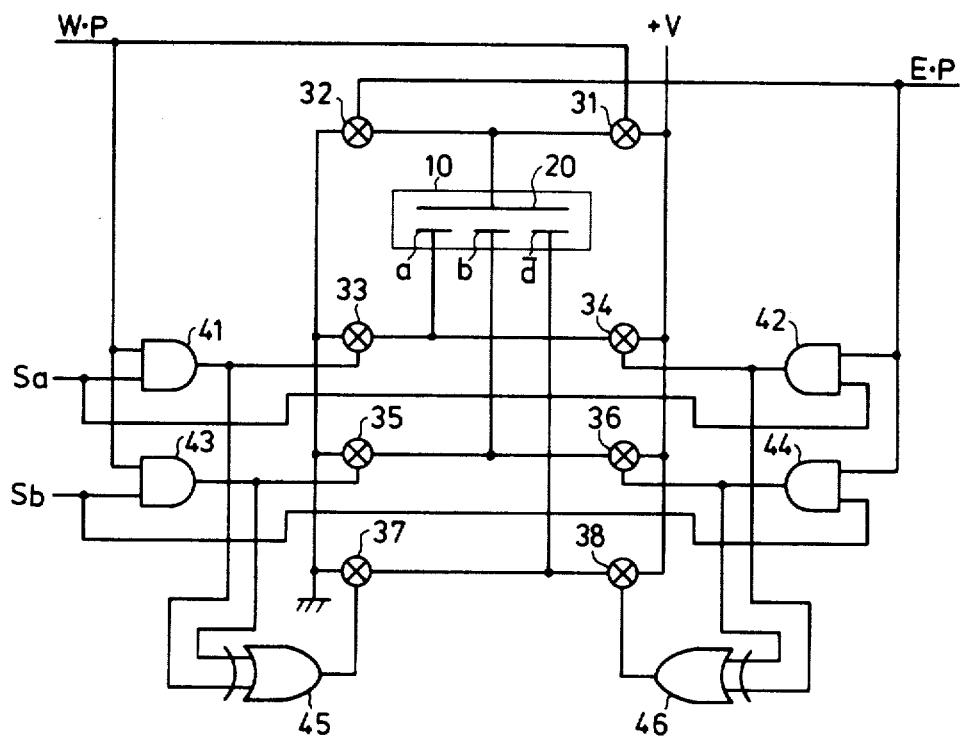
FIG. 6 is a circuit diagram of a fundamental apparatus embodying the present invention.

FIG. 6 is a circuit diagram of a fundamental apparatus embodying the present invention.

In the example of FIG. 6, the ECD 10 comprises two indicating electrodes "a", "b", an auxiliary electrode "d̄", and counter-electrode 20. Each of the abovementioned electrodes "a", "b", "d̄" and 20 are connected to a pair of switching means 31–32, 33–34, 35–36 and 37–38, respectively as shown in FIG. 6. The abovementioned switching means act in compliance with logic signals, that is, turn on at the "H" level of the logic signal, and turn off at the "L" level of the logic signal.

In order to make the indicating electrode "a" effect colored state, the switching means 31 and the switching means 33 are simultaneously turned on, and a source voltage +V is impressed on the counter-electrode 20. In order to obtain the abovementioned driving action by the driving circuit, the write-driving signal W·P and the "a" electrode selecting signal Sa must be simultaneously high ("H"). The switching means 31 is turned on by the "H" level of the write-driving signal, and the switching means 33 is turned on by the "H" level output signal of an AND gate circuit 41. Then a coloring substance from the EC-solution is formed on the surface of the indicating electrode "a" through the electrochemical cathode-reduction reaction.

The formation of the coloring substance depends on the quantity of charge, which is controlled by the write-driving signal and the impressed voltage +V on the counter-electrode. Therefore, the display color density is determined by the quantity of charge supplied to the indicating electrodes. Accordingly, the display color state may be held for a long period after cutting off of the indicating electrode by removing the write-driving signal W·P from the circuit. This is a memory function of the ECD.

Erasing an indication on the indicating electrode "a" is accomplished by generating a current between the indicating and counter electrodes in the reverse direction. This is done by simultaneously applying the "a" electrode-selecting signal Sa and an erase driving signal E·P to the driving circuit. The signal Sa and the signal E·P are produced by turning on the switching means 32 connected to the counter-electrode 20 and turning on the switching means 34 connected to the indicating electrode "a" by receiving an output signal from an AND gate circuit 42. Then, the electrochemical anode-oxidation reaction occurs at the indicating electrode "a", and resultantly the coloring on the indication electrode "a" is erased by this reaction. The quantity of charge for this anode-oxidation reaction is selected in a manner that the coloring product is entirely decomposed.

In order to color or erase the indication electrode "b", the "b" electrode selecting signal Sb, write-driving signal W·P, and erase-driving signal E·P are selectively generated in accordance with a prescribed combination, to control operation of AND gate circuits 43, 44. The switching means 35, 36 are selectively driven by the output signals of AND gate circuits 43, 44, respectively, and the counter-electrode 20 is simultaneously driven by a synchronous action of a pair of switching means 31, 32, in a similar driving action as the driving of the indicating electrode "a" as abovementioned.

In the meanwhile, the auxiliary electrode "d̄" is driven by a signal supplied through the switching means 37 and 38, which are in turn driven by output signals of Exclusive-OR (Ex-OR) gate circuits 45, 46, respectively.

The input signals to the Ex-OR gate circuit 45 and 46 are the "a" electrode selecting signal Sa and "b" electrode selecting signal Sb, respectively. Accordingly, the auxiliary electrode "d̄" effects the indicating mode only when one (but not both) of the indicating electrodes "a" or "b" is in the indicating mode. Thus the auxiliary electrode "d̄" is driven together with the indicating electrode "a" or the indicating electrode "b", when only one of the indicating electrodes "a" or "b" is in the indicating mode.

Figure 7:
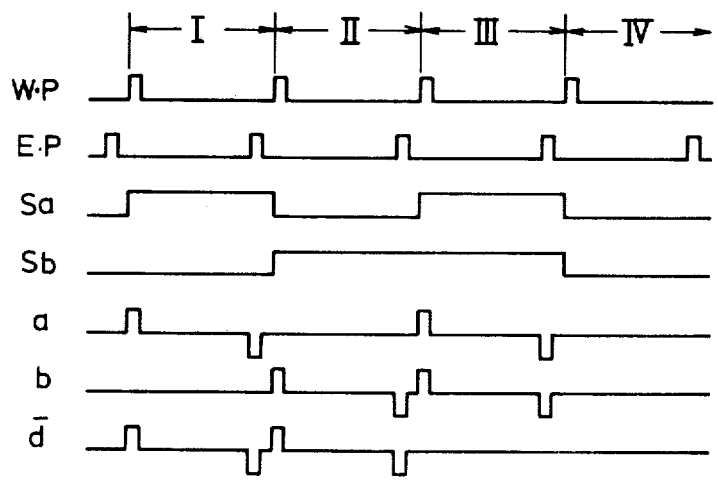
FIG. 7 is a timing chart of the various parts of the circuit shown in FIG. 6.

FIG. 7 is a timing chart of the various parts of the circuit shown in FIG. 6. In FIG. 7, the auxiliary electrode "d̄" is driven in the periods I and II. And in the period of III and IV, both indicating electrode "a" and "b" are driven in the same mode of indicating mode or erasing mode, and the auxiliary electrode "d̄" is not driven since there is no signal to drive the auxiliary electrode "d̄" in the period III and IV. In the timing chart, potential levels of electrodes "a", "b" and "d̄" are shown positive or negative in relation to the potential of the counter-electrode 20.

In the embodiment of present invention, by making the areas of the electrodes "a", "b" and "d̄" almost the same each other, a driving charge density at the indicating electrodes can be made uniform for both cases that both indicating electrodes "a", "b" are simultaneously driven indicating mode, and that either one of the indicating electrode is driven. Therefore, a high quality display of regular color density of displaying is obtainable.

Figure 8:
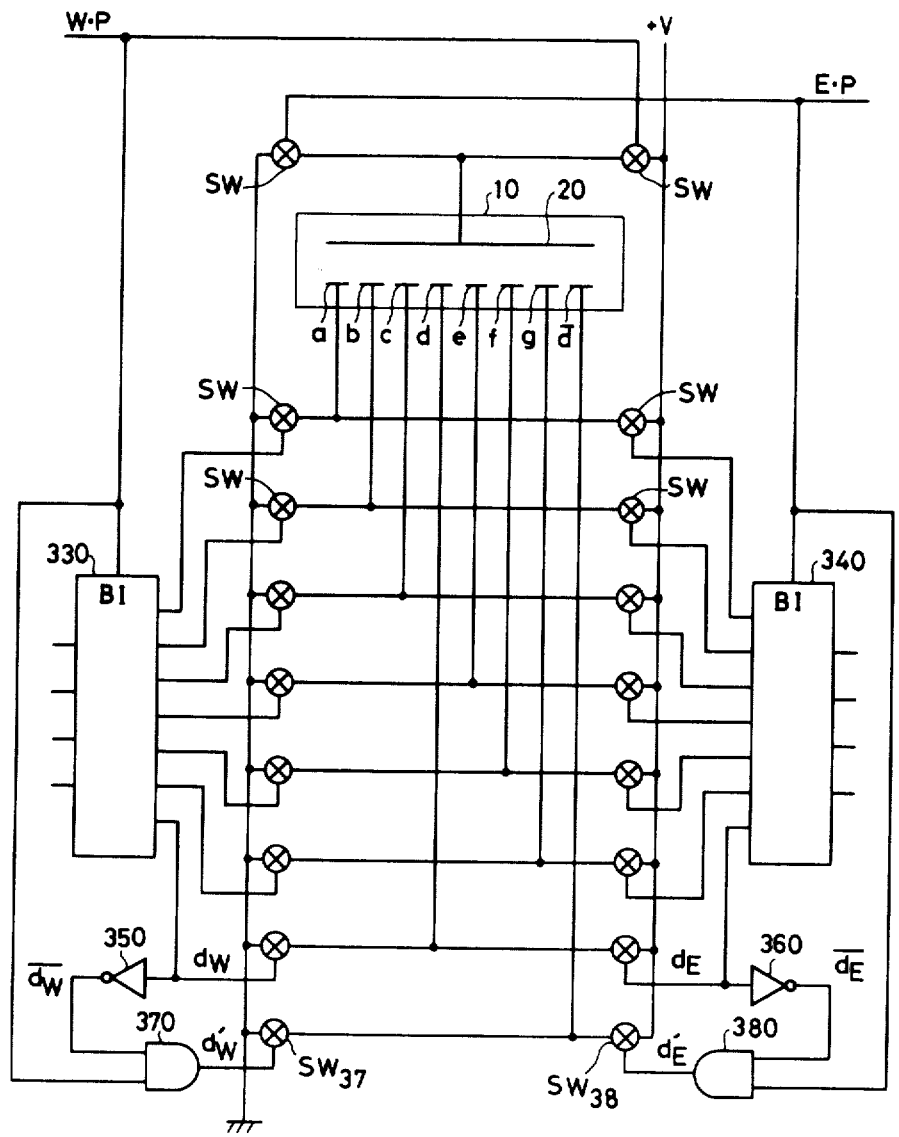
FIG. 8 is a circuit diagram of an apparatus embodying the present invention.

FIG. 8 is a circuit diagram of the actual seven segment numeral indication apparatus embodying the present invention. In FIG. 8, an ECD 10 comprises seven indicating electrodes "a", "b", "c", "d", "e", "f" and "g", an auxiliary electrode "d̄", and a counter-electrode 20. And its driving circuit comprises switching means SW to drive corresponding electrodes, and driving signal systems to drive the respective switching means SW. The ECD 10 is a seven segment figure display device which comprises seven indicating electrodes (segments) and an auxiliary electrode, wherein the seven segments can indicate numerals 0-9 by combination thereof. The indicating electrodes are selectively driven by an output signal of seven-segments decorders 330, 340 having a blanking input terminals BI, and the corresponding switching means SW are simultaneously driven. The auxiliary electrode "d̄" is driven by a signal complementary to the driving signal associated with electrode "d". In this 7 segment display the segment "d" is not utilized in indicting numerals 1, 4 or 7 having small number of indicating electrodes. Accordingly, the auxiliary electrode "d" may be driven concurrently with "1", "4", or "7" displays using the "d̄" control signal. Accordingly, the sum total surface area of the indicating electrodes, whereon the electrochemical reaction occurs, is increased, and the charge density on the acting indicating electrodes therefor takes almost uniform value for indications of any of the numerals. Display color density on the actuated indicating electrodes becomes almost uniform for every indication of numerals 0 to 9.

Figure 9:
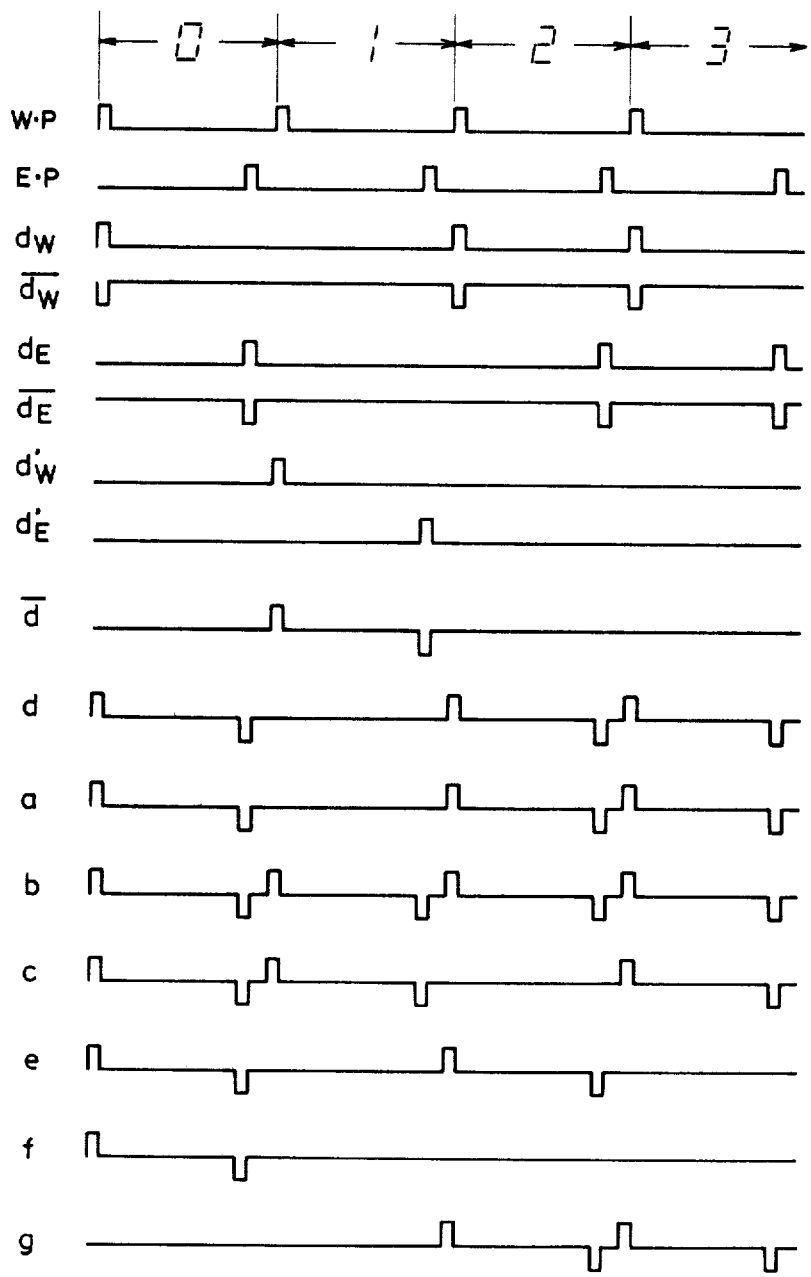
FIG. 9 is a timing chart of various parts of the circuit shown in FIG. 8.

FIG. 9 is a timing chart of various parts of circuit shown in FIG. 8, showing driving actions to indicate a numeral "0", "1", "2" and "3". In FIG. 9, output signal $d_W$ issued from the "d" terminal of a seven segment decoder 330 is generated concurrently with signal W·P during the time periods in which symbols 0, 2 and 3 are indicated. Similarly, output signal $d_E$ issued from the output terminal "d" of the segment decoder 340 concurrently with erasing signal E·P in the numeral indicating periods of 0, 2 and 3. Driving signals $d_W'$ and $d_E'$ to be applied to switching elements $SW_{37}$ and $SW_{38}$, associated with auxiliary electrodes d̄ are produced by AND gates 370 and AND gates 380. AND gate 370 receives signal $\overline{d_W}$ obtained by inverting the signal $d_W$ by an inverter 350 and the write-driving signal W·P and issues the signal $d_W'$. AND gate 380 receives signal $\overline{d_E}$ obtained by inverting the signal $d_E$ by an inverter 360 and the erase-driving signal E·P and issues the signal $d_E'$. By utilizing the signal $d_W'$ and the signal $d_E'$ to drive a corresponding switching means, auxiliary electrode "d̄" is driven to indicating-state or to erasing-state during the period in which numeral "1" is indicated.

In addition, since the auxiliary electrode "d̄" is independent from respective indicating electrode and is hidden from sight by counter-electrode 20, its shape and arrangement may be freely selected so that the quality of display is not deteriorated. Preferably, the auxiliary electrode "d̄" is to be arranged to be hidden from the sight of user.

The area of auxiliary electrode 20 is selected in accordance with the areas of the respective indicating electrodes. The auxiliary electrode can be arranged divided into several parts if necessary.

As abovementioned, an ECD of the present invention comprises a plurality of indicating electrodes and counter electrode, and an auxiliary electrode which acts in the same operational mode as at least one of the indicating electrodes, and improves uniformity of the indications of various numerals, thereby providing a high quality of display.

The present invention is especially advantageous in case of an organic ECD wherein cathode-reduction reaction and anode-oxidation reaction alternately occurs on the indicating electrodes and the counter-electrode.

What we claim is:

1. An electrochromic display device comprising:
   a first and a second substrate disposed with a predetermined gap space in between, at least one of said substrates being at least partly transparent,
   at least one group of indicating electrodes disposed on said first substrate for displaying character forms by selective energization thereof,
   a counter-electrode disposed on said second substrate,
   an auxiliary electrode for receiving a charge concurrently with said indicating electrodes when the energized indicating electrodes present a comparatively small total area,
   lead-out terminals connected to said indicating electrodes, said counter electrode and said auxiliary electrode, and
   an electrochromic solution confined in said gap space between said first and said second substrates to provide colored mode and uncolored mode operation on the surface of said indicating electrodes by electrochemical reaction.

2. An electrochromic display device of claim 1, wherein said auxiliary electrode is disposed near said indicating electrodes.

3. An electrochromic display device of claim 1, wherein said auxiliary electrode is covered by an opaque screening means.

4. An electrochromic display device of claim 1, wherein said second substrate is transparent, and said counter-electrode on said second substrate is opaque and has apertures in portions overlying said indicating electrodes.

5. An electrochromic display device comprising: a first and a second substrates disposed substantially parallel to each other with a predetermined gap space in between, the peripheral parts of said substrates being sealed by a sealing means thereby closing said gap space, at least one of said substrates being at least partly transparent,
   seven-segment type indication electrodes disposed on the inner face of said first substrate, responsive to driving signals selectively applied thereto, for displaying a character by selective energization thereof,
   a counter-electrode disposed on the inner face of said second substrate,
   an auxiliary electrode, responsive to a signal which is complementary to the driving signal to a predetermined segment of said indication electrodes to energize said auxiliary electrode concurrently with predetermined combinations of segments of said indication electrodes,
   lead-out terminals connected to said indication electrodes, said counter electrode and said auxiliary electrode, and
   an electrochromic solution confined in said gap space, said electrochromic solution containing organic electrochromic substance which makes coloring-discoloring by cathode-reduction and anode-oxidation on said indication electrodes, and auxiliary electrode and said counter electrode.

6. An electrochromic display device in accordance with claim 5, wherein said auxiliary electrode has an area of about 3–5 times larger than an average area of one of said electrode segment.

7. An electrochromic display device comprising: first and second substrates disposed to form a cavity therebetween, said second substrate being at least partially transparent;

an electrochromic solution retained in said cavity;

a plurality of individually actuable indicator electrode segments disposed on the interior surface of said first substrate in contact with said solution;

an opaque counter electrode disposed on the interior surface of said second substrate in contact with said solution, said counter electrode including an aperture disposed in registry with said transparent portion to provide visual access to said indicating electrode segments;

an auxiliary area compensation electrode, disposed on said first substrate interior surface in contact with said solution underlying said opaque counter electrode; and control means for selectively generating a current between said counter electrode and respective combinations of individual indicator electrode segments to form designated characters, including area compensation means for selectively generating a current between said counter electrode and said auxiliary area compensation electrode concurrently with generation of currents between said counter electrode and predetermined combinations of said individual indicator electrode segments to compensate for changes in total actuated indicator electrode area between said respective combinations.

* * * * *